US012749172B2

(12) United States Patent
Gayle

(10) Patent No.: US 12,749,172 B2
(45) Date of Patent: Sep. 29, 2026

(54) VISUAL SYSTEMS AND STATISTICAL METHODS FOR NON-DESTRUCTIVELY EVALUATING COMPONENT PARTS

(71) Applicant: THE BOEING COMPANY, Arlington, VA (US)

(72) Inventor: David Michael Gayle, Summerville, SC (US)

(73) Assignee: The Boeing Company, Arlington, VA (US)

( * ) Notice: Subject to any disclaimer, the term of this patent is extended or adjusted under 35 U.S.C. 154(b) by 209 days.

(21) Appl. No.: 18/595,497

(22) Filed: Mar. 5, 2024

(65) Prior Publication Data

US 2025/0285255 A1 Sep. 11, 2025

(51) Int. Cl.
*G06T 7/00* (2017.01)
*G01N 21/88* (2006.01)

(52) U.S. Cl.
CPC ....... *G06T 7/0004* (2013.01); *G01N 21/8851* (2013.01); *G01N 2021/889* (2013.01); *G01N 2201/062* (2013.01); *G06T 2200/24* (2013.01); *G06T 2207/20072* (2013.01); *G06T 2207/20224* (2013.01)

(58) Field of Classification Search
CPC ............... G06T 7/0004; G06T 2200/24; G06T 2207/20072; G06T 2207/20224; G01N 21/8851; G01N 21/8806; G01N 2021/889; G01N 2201/062
See application file for complete search history.

(56) References Cited

U.S. PATENT DOCUMENTS 10,402,678 B2 * 9/2019 Morard ................. G06T 7/0004
2006/0078191 A1 * 4/2006 Matsumura ........ G01N 21/8851 382/149
2007/0041657 A1 * 2/2007 Rychagov ................. G06T 5/92 382/168
2007/0071304 A1 * 3/2007 Kuchii .................. G06T 7/0004 382/141

(Continued)

FOREIGN PATENT DOCUMENTS

WO WO-2017087451 A1 * 5/2017 ............... G06T 7/90

OTHER PUBLICATIONS

Elbehiery, Hussam, Alaa Hefnawy, and Mohamed Elewa. "Surface defects detection for ceramic tiles using image processing and morphological techniques." (2005). (Year: 2005).*

(Continued)

*Primary Examiner* — Carol W Chan
(74) *Attorney, Agent, or Firm* — Joseph M. Butscher; Carroll, Hoette & Butscher, LLC

(57) ABSTRACT

A system and a method include a light emitter configured to emit light onto or into a part to illuminate the part. A detector is configured to acquire one or more digital images of the part as illuminated by the light. A control unit is in communication with the detector. The control unit is configured to receive the one or more digital images of the part as illuminated by the light from the detector, and automatically analyze the one or more digital images of the part (to normalize out, such as by removing, known geometric features) as illuminated by the light to one or both of detect one or more defects of the part, or determine a porosity of the part.

21 Claims, 6 Drawing Sheets

(56) References Cited

U.S. PATENT DOCUMENTS

| | | | | |
|---|---|---|---|---|
| 2015/0346115 | A1* | 12/2015 | Seibel | G06T 7/33 348/50 |
| 2022/0042924 | A1* | 2/2022 | Beckett | B22F 10/38 |
| 2022/0415020 | A1* | 12/2022 | Kashanipour | G01N 23/18 |
| 2024/0257331 | A1* | 8/2024 | Bina | G06T 7/0004 |
| 2024/0362888 | A1* | 10/2024 | Taira | G06T 7/0004 |

OTHER PUBLICATIONS

Gan, Ming, and Jianhua Wang. "Applications of image processing technique in porous material characterization." Advanced image acquisition, processing techniques and applications (2012): 109-122. (Year: 2012).*

Liao, Yi, Xin Weng, C. W. Swonger, and Jun Ni. "Defect detection and classification of machined surfaces under multiple illuminant directions." In Applications of Digital Image Processing XXXIII, vol. 7798, pp. 541-556. SPIE, 2010. (Year: 2010).*

Steiner, Dvir, and Reuven Katz. "Measurement techniques for the inspection of porosity flaws on machined surfaces." Journal of computing and information science in engineering 7, No. 1 (2007): 85-94. (Year: 2007).*

* cited by examiner

VISUAL SYSTEMS AND STATISTICAL METHODS FOR NON-DESTRUCTIVELY EVALUATING COMPONENT PARTS

FIELD OF THE DISCLOSURE

Examples of the present disclosure generally relate to systems and methods for non-destructively inspecting component parts, such as translucent composite panels, beams, or other such structures.

BACKGROUND OF THE DISCLOSURE

During a manufacturing process, various structures can be inspected to ensure structural integrity. For example, an individual can visually inspect a structure for potential defects.

Visual inspection of component parts, such as translucent composite parts, can be subjective and imprecise. As such, strict guidelines for colorblindness and visual acuity may be required for individuals performing such inspections. As can be appreciated, however, such processes can be prone to human error.

SUMMARY OF THE DISCLOSURE

A need exists for an improved system and method for inspecting component parts to ensure structural integrity. Further, a need exists for an efficient and effective system and method for visually inspecting component parts without the subjectivity of the human eye.

With those needs in mind, certain examples of the present disclosure provide a system including a light emitter configured to emit light onto or into a part to illuminate the part. A detector is configured to acquire one or more digital images of the part as illuminated by the light. A control unit is in communication with the detector. The control unit is configured to receive the one or more digital images of the part as illuminated by the light from the detector, and automatically analyze the one or more digital images of the part as illuminated by the light to detect one or more defects of the part, and/or determine a porosity of the part. In at least one example, the digital images of the part are analyzed to normalize out, such as by removing, certain known geometric features.

In at least one example, the detector includes a digital camera. The light emitter can be separated from the part.

In at least one example, a user interface is in communication with the control unit. The user interface includes a display. The control unit is configured to show information regarding the part on the display.

In at least one example, the control unit is configured to automatically analyze the one or more digital images by determining a mean and a standard deviation of one or more portions of the one or more digital images.

In at least one example, the control unit is configured to automatically analyze the one or more digital images by determining a signal-to-noise ratio (SNR) of one or more portions of the one of more digital images.

In at least one example, the control unit is configured to analyze the one or more digital images to generate a histogram in relation to one or more portions of the one or more digital images, and determine a mean and a standard deviation from the histogram.

The control unit can be an artificial intelligence or machine learning system.

Certain examples of the present disclosure provide a method comprising: emitting, by the light emitter, the light onto or into the part to diffusively illuminate the part; acquiring, by the detector, the one or more digital images of the part as illuminated by the light; receiving, by the control unit, the one or more digital images of the part as illuminated by the light from the detector; and automatically analyzing, by the control unit, the one or more digital images of the part as illuminated by the light, wherein said automatically analyzing comprises one or both of detecting the one or more defects of the part, or determining the porosity of the part.

DETAILED DESCRIPTION OF THE DISCLOSURE

The foregoing summary, as well as the following detailed description of certain examples will be better understood when read in conjunction with the appended drawings. As used herein, an element or step recited in the singular and preceded by the word "a" or "an" should be understood as not necessarily excluding the plural of the elements or steps. Further, references to "one example" are not intended to be interpreted as excluding the existence of additional examples that also incorporate the recited features. Moreover, unless explicitly stated to the contrary, examples "comprising" or "having" an element or a plurality of elements having a particular condition can include additional elements not having that condition.

Examples of the present disclosure provide systems and methods that eliminate, minimize, or otherwise reduce human error in relation to visual inspection of parts. The systems and methods utilize digital cameras, which acquire data that is statistically interrogated and analyzed. The systems and methods described herein assist in the automation of visual inspection for surface and internal defect in parts (for example, translucent parts), and remove the subjective human element through the use of statistical analysis.

Figure 1:
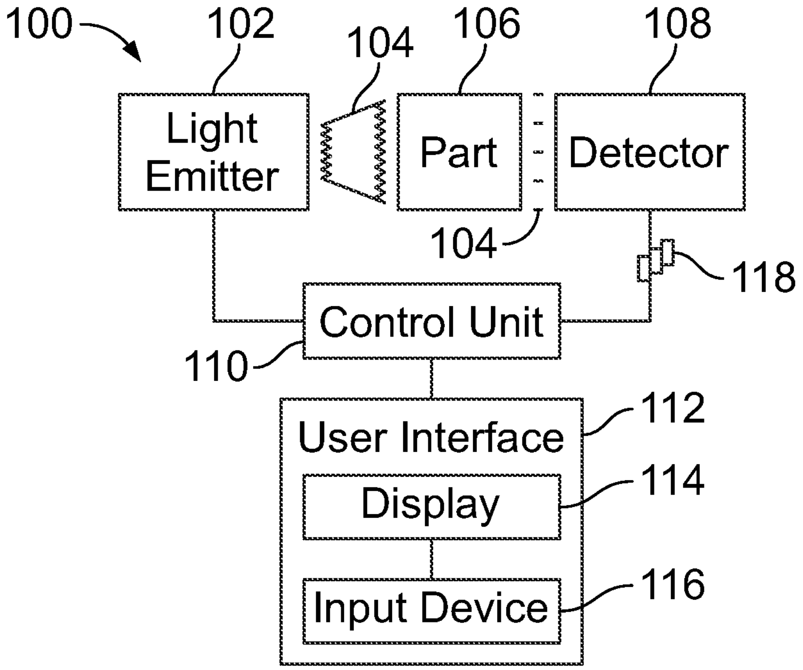
FIG. 1 illustrates a block diagram of a system, according to an example of the present disclosure.

FIG. 1 illustrates a block diagram of a system 100, according to an example of the present disclosure. The system 100 includes a light emitter 102 configured to emit light onto and/or into a part 106. The light 104 reflects off, and/or passes through the part and is received by a detector 108.

In at least one example, the light emitter 102 includes one or more light emitting diodes (LEDs) configured to emit the light. As another example, the light emitter 102 is or otherwise includes one more incandescent light bulbs. As another example, the light emitter 102 is or otherwise includes one or more lasers. As another example, the light emitter 102 is or otherwise includes one or more infrared red light sources.

The part 106 can be any part that is configured to be non-destructively inspected in relation to structural integrity. The part 106 is inspected to find any defects. The part 106 can be a composite structure, such as a composite panel, beam, or the like. The part 106 can be translucent or transparent, and configured to allow at least a portion of the light 104 to pass therethrough.

In at least one example, the light emitter 102 is separated from the part 106. As another example, the light emitter 102 can be mounted on or within the part 106.

In at least one example, the detector 108 is a camera, such as a digital photographic camera. As another example, the camera is a digital video camera.

The system 100 also includes a control unit 110 in communication with one or both of the light emitter 102 and/or the detector 108, such as through one or more wired or wireless connections. In at least one example, the control unit 110 is also in communication with a user interface 112, such as through one or more wired or wireless connections. The user interface 112 includes a display 114 and an input device 116. In at least one example, the display 114 is an electronic device configured to electronically show images, videos, text, and/or the like. The display 114 can be a monitor, screen, television, touchscreen, and/or the like. The input device 116 can include a keyboard, mouse, stylus, touchscreen interface (that is, the input device 116 can be integral with the display 114), and/or the like. The control unit 110 and the user interface 112 can be, or part of, a computer workstation. As another example, the control unit 110 and the user interface 112 can be, or part of, a handheld device, such as a smart phone, tablet, or the like.

In operation, the light emitter 102 emits the light onto and/or into the part 106. The detector 108 acquires one or more digital images 118 of the illuminated part 106. The control unit 110 receives the digital image(s) 118 from the detector 108, and statistically analyzes the digital image(s) 118 to determine a structural integrity of the part 106. For example, the control unit 110 analyzes the digital image(s) 118 to detect whether any defect exists in the part 106.

In at least one example, the control unit 110 statistically validates the light emitter in relation to brightness and diffusion. In at least one example, the control unit 110 also analyzes the image(s) 118 in relation to a signal-to-noise ratio (SNR) to provide a quantitative measurement.

In at least one example, the control unit 110 analyzes the image(s) 118 in relation to a mean and/or a standard deviation. Further, the control unit 110 can compare the SNR against a background to verify there is a 3:1 SNR. The control unit 110 can also plot the mean and the standard deviation to provide a porosity curve.

As described herein, the system 100 includes the light emitter 102, which is configured to emit light 104 onto or into the part 106 to illuminate the part 106. The detector 108 is configured to acquire one or more digital images 118 of the part 106 as illuminated by the light 104. The control unit 110 is in communication with the detector 108. The control unit 110 is configured to receive the one or more digital images 118 of the part 106 as illuminated by the light 104 from the detector 108. The control unit 110 is further configured to automatically analyze (without human intervention) the one or more digital images 118 of the part 106 as illuminated by the light 104 to detect one or more defects of the part 106, and/or a porosity of the part 106. In at least one example, the defects include a void, an inclusion, a delamination, a cut, a tear, or the like on an outer surface of the part 106. In at least one example, the porosity relates to internal features (such as internal pores, openings, or the like) of the part 106, such as portions between outer surfaces of the part 106.

In at least one example, the control unit 110 is configured to show information regarding the part 106 on the display 114 of the user interface 112. The information relates to the defects of the part 106, and/or the porosity of the part 106. In at least one example, the information includes statistical data, such as a mean, a standard deviation, a signal-to-noise ratio (SNR), and/or the like of one or more digital images 118 of the part 106.

In at least one example, The system of claim 1, the control unit 110 is can also subtract a digital image from a baseline image (such as stored in a memory) to remove known geometry effects to light transmission, and enhance defect detection.

Figure 2:
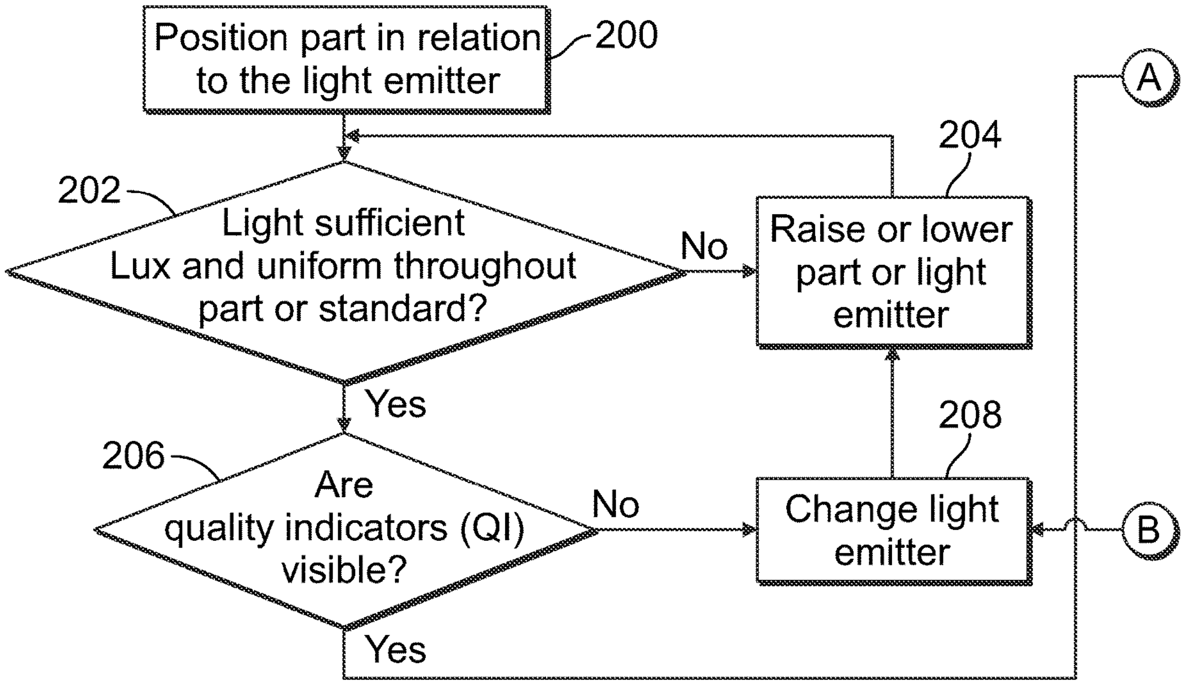
FIG. 2 illustrates a flow chart of a qualitative assessment method, according to an example of the present disclosure.

FIG. 2 illustrates a flow chart of a qualitative assessment method, according to an example of the present disclosure. Referring to FIGS. 1 and 2, before the control unit 110 receives the digital images 118 from the detector 108, the system 100 is first qualitatively assessed. At 200, the part 106 (such as a translucent composite part or a reference standard part) is positioned in relation to the light emitter 102. For example, the part 106 is placed over the light emitter 102 at a known distance.

Next, at 202, it is determined if the light 104 emitted by the light emitter 102 is of sufficient intensity and uniform throughout the part 106. In at least one example, such a determination can be performed by an individual. As another example, the control unit 110 can automatically perform such step, such as by analyzing one or more test images of the part 106, as received by the detector 108. As an example, if the test images indicate a resulting predetermined light intensity (such as stored in memory), and the test images indicate a uniform light distribution throughout the part 106, the control unit 110 determines that the light emitted by the light emitter 102 is of sufficient intensity and uniform through the part 106.

If the control unit 110 compares the test images of the part 106 with the stored data regarding the light intensity and uniformity and determines that the light 104 emitted by the light emitter 102 is not of sufficient intensity and/or not uniform throughout the part 106, the method proceeds from 202 to 204, at which the light emitter 102 and/or the part 106 are repositioned in relation to one another (such as by raising or lowering the part 106 in relation to the light emitter 102), and the method returns to 202.

If, however, the control unit 110 determines that the light 104 is of sufficient intensity and uniform through the part 106 at 202, the method proceeds from 202 to 206, at which the control unit 110 determines if quality indicators within the test images are visible. The quality indicators can be features, such as spots, texts, markings, or the like of the part 106. If the control unit 110 does not detect the quality indicators in the test images, the method proceeds from 206 to 208, at which the light emitter 102 is changed to a different light emitter 102, and the method proceeds to 204.

If, however, the control unit 110 determines that the quality indicators are visible in the test image(s), the method then proceeds to a quantitative assessment.

Figure 3:
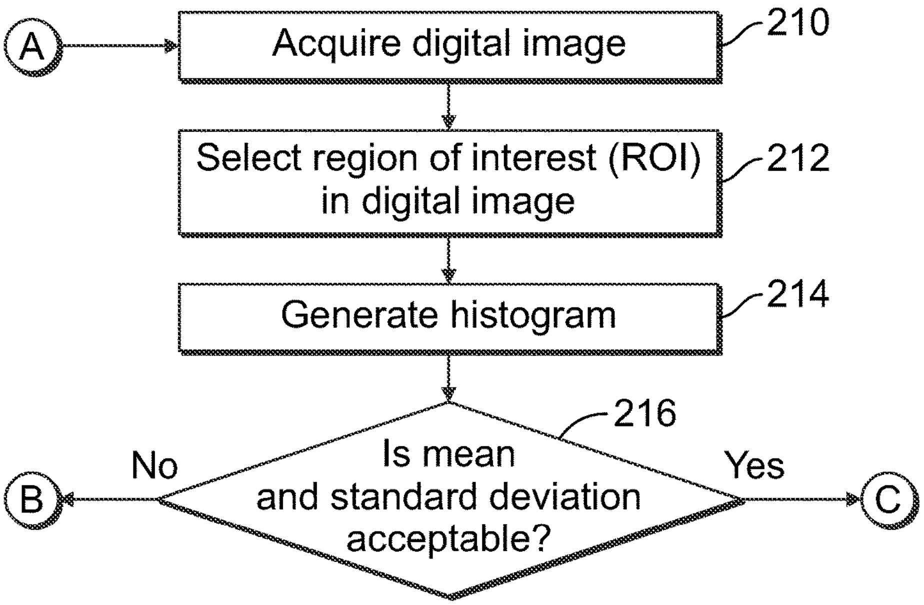
FIG. 3 illustrates a flow chart of a quantitative assessment method, according to an example of the present disclosure.

FIG. 3 illustrates a flow chart of a quantitative assessment method, according to an example of the present disclosure.

Referring to FIGS. 1-3, if the quality indicators are visible in the test image(s) at 206, the method proceeds to 210, at which the control unit 110 receives one or more image digital image(s) 118 of the part 106, as illuminated by the light 104 emitted by the light emitter 102. The digital image(s) 118 are images of illuminated surfaces of the part 106.

Figure 4:
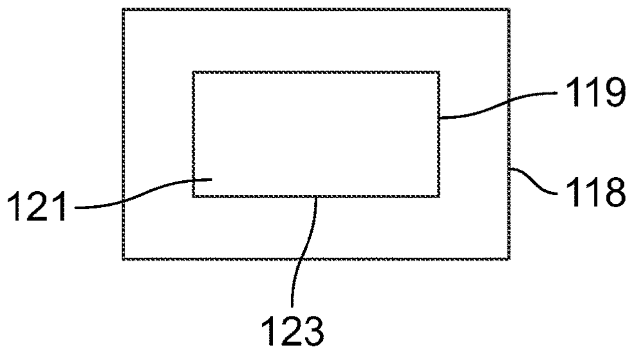
FIG. 4 illustrates a front view of a digital image, according to an example of the present disclosure.

FIG. 4 illustrates a front view of a digital image 118, according to an example of the present disclosure. Referring to FIGS. 1, 3, and 4, at 212, the control unit 110 selects a region of interest 119 in a digital image 118. The region of interest 119 can be an area 121 bounded by a rectangle 123 of a predetermined size and shape. The control unit 110 automatically selects the region of interest 119, such as based on a desired sample size representative of the acquired digital image 118. In at least one example, the region of region of interest 119 is automatically selected as a limited sample area to provide a reference area that is devoid of extraneous features, such as wrinkles.

Figure 5:
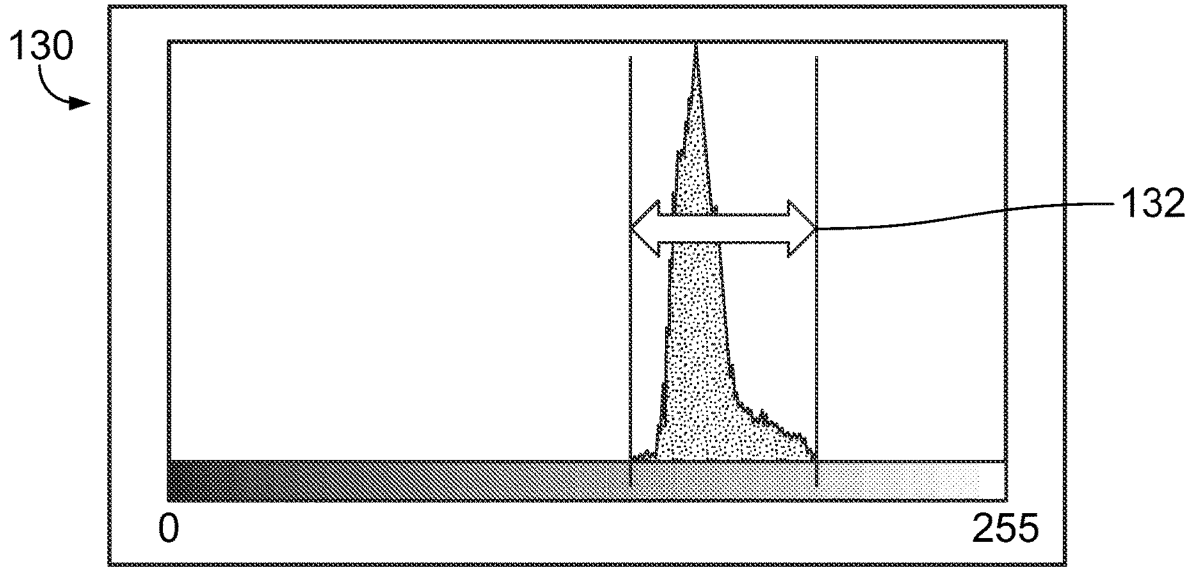
FIG. 5 illustrates a histogram, according to an example of the present disclosure.

FIG. 5 illustrates a histogram 130, according to an example of the present disclosure. Referring to FIGS. 1, 3, 4, and 5, at 214, the control unit 110 generates a histogram 130 with respect to the digital image 118 and/or the region of interest 119. The histogram 130 includes a Gaussian spread 132, which is a light source variation within the region of interest 119. The Gaussian spread typically increases if the light emitter 102 lacks diffusion grating, and/or if the distance from the light emitter 102 to the part 106 is improper. The histogram 130 includes a mean, and a standard deviation.

At 216, the control unit 110 determines if the mean and the standard deviation of the histogram 130 are acceptable, as set forth in data stored in a memory. If the mean and the standard deviation of the histogram are not acceptable, the method returns to step 208 in FIG. 2. If, however, the mean and the standard deviation are acceptable at 216, the method proceeds to an inspection process, such as to determine the existence of a defect, such aa a void, delamination, or foreign material within the part 106 (as detected in the acquired digital image 118), and/or porosity of the part 106 (as detected in the acquired digital image 118).

Figure 6:
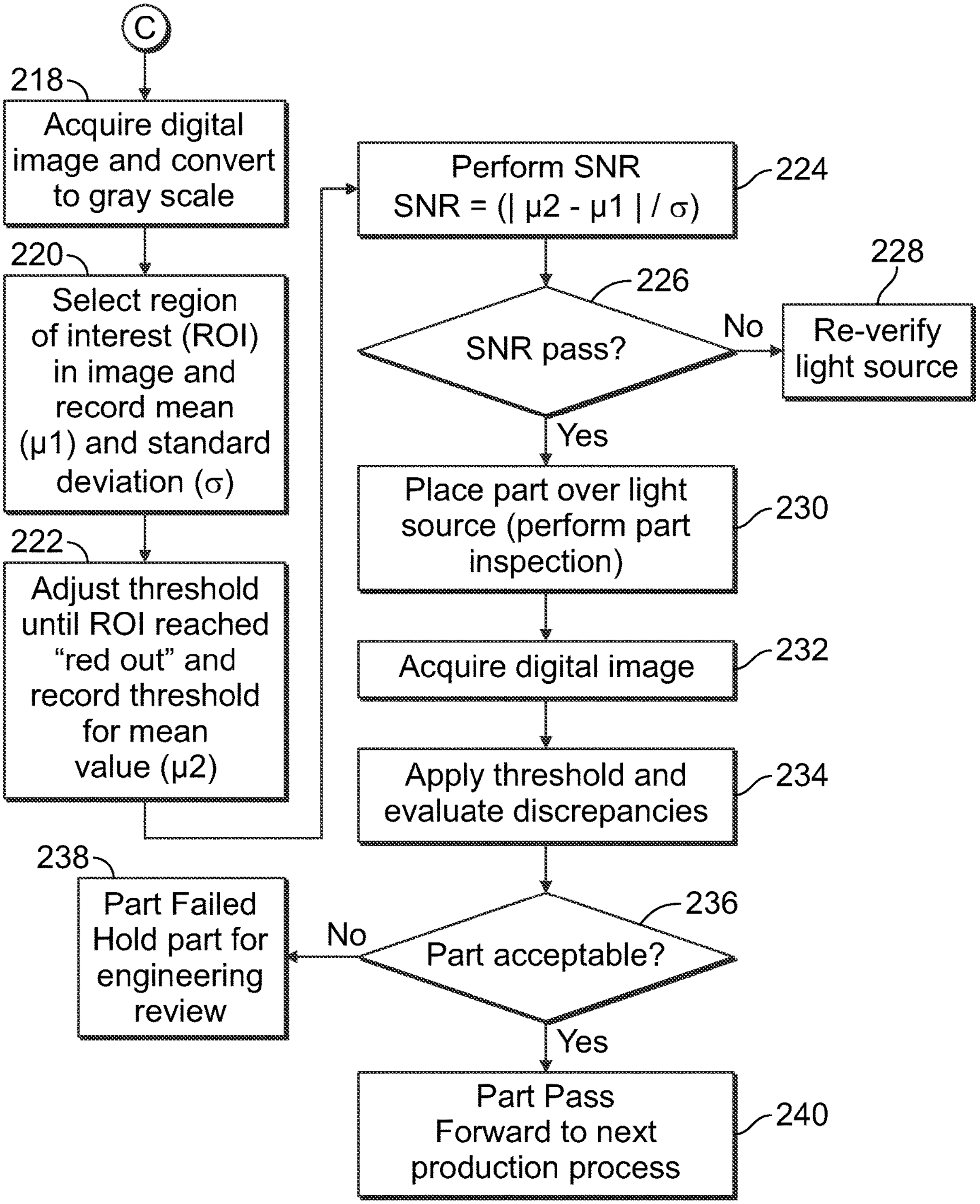
FIG. 6 illustrates a flow chart of a method of detecting a defect in a digital image of a part, according to an example of the present disclosure.

FIG. 6 illustrates a flow chart of a method of detecting a defect in a digital image of a part, according to an example of the present disclosure. Referring to FIGS. 1, 5, and 6, after confirming that the mean and the standard deviation of the histogram 130 is acceptable, at 218, the control unit 110 converts the digital image(s) 118 of the part 106, as illuminated by the light emitter 102, to a gray scale. Next, the control unit 110 records the mean and the standard deviation of the region of interest 119 within the digital image 118. At 222, the control unit 110 then adjusts a threshold until the region of interest 119 reaches a predetermined red out, and then records the threshold for the mean value. Next, at 224, the control unit 110 determines a signal to noise ratio (SNR) with respect to the region of interest 119.

As an example, the SNR is a measure of the level of desired light intensity of the digital image(s) 118 with respect to light intensity of background light. The background light can be determined from data stored in a memory of a test image that does not include the part 106.

At 226, the control unit 110 then determines if the SNR is acceptable, based on predetermined stored data. For example, a 3:1 SNR is acceptable. If, at 226, the SNR is not acceptable, the method proceeds to 228, at which the light emitter 102 is re-verified (and the method can then return to step 200 in FIG. 2).

If, however, the SNR is acceptable at 226, the method proceeds to 230, at which the part 106 is inspected, and digital images 118 are acquired at 232. At 234, the control unit 110 applies the threshold (as previously recorded) to the digital images 118 to evaluate discrepancies. Based on step 234, the control unit 110 determines if the part 106 is acceptable (that is, free of defects) at 236. If not, at 238, the control unit 110 determines that the part 106 has failed (that is, includes one or more defects), and is held for engineering review. The control unit 110 may output data regarding such determination to the display 114. For example, the control unit 110 may show one or more messages indicating such determination on the display 114. If, however, the control unit 110 determines that the part is acceptable at 236, at 240 the control unit 110 can pass the part 106 forward to a next production process. The control unit 110 may output data regarding such determination to the display 114.

As described, the control unit 110 automatically analyzes the digital images 118 of the part 106, as illuminated by the light 104 emitted from the light emitter 102, to determine the existence of one or more defects (such as a void, delamination, foreign material, and/or the like) within the part 106. In this manner, the control unit 110 eliminates, minimizes, or otherwise reduces human error in analyzing the part 106 for defects.

In addition to analyzing the digital image(s) 118 to determine the existence of defects, the control unit 110 can also automatically analyze the digital image(s) 118 to detect porosity of the part 106. Optionally, the control unit 110 can automatically analyze the digital image(s) 118 to detect the porosity of the part 106 without determining the existence of defects of the part.

Figure 7:
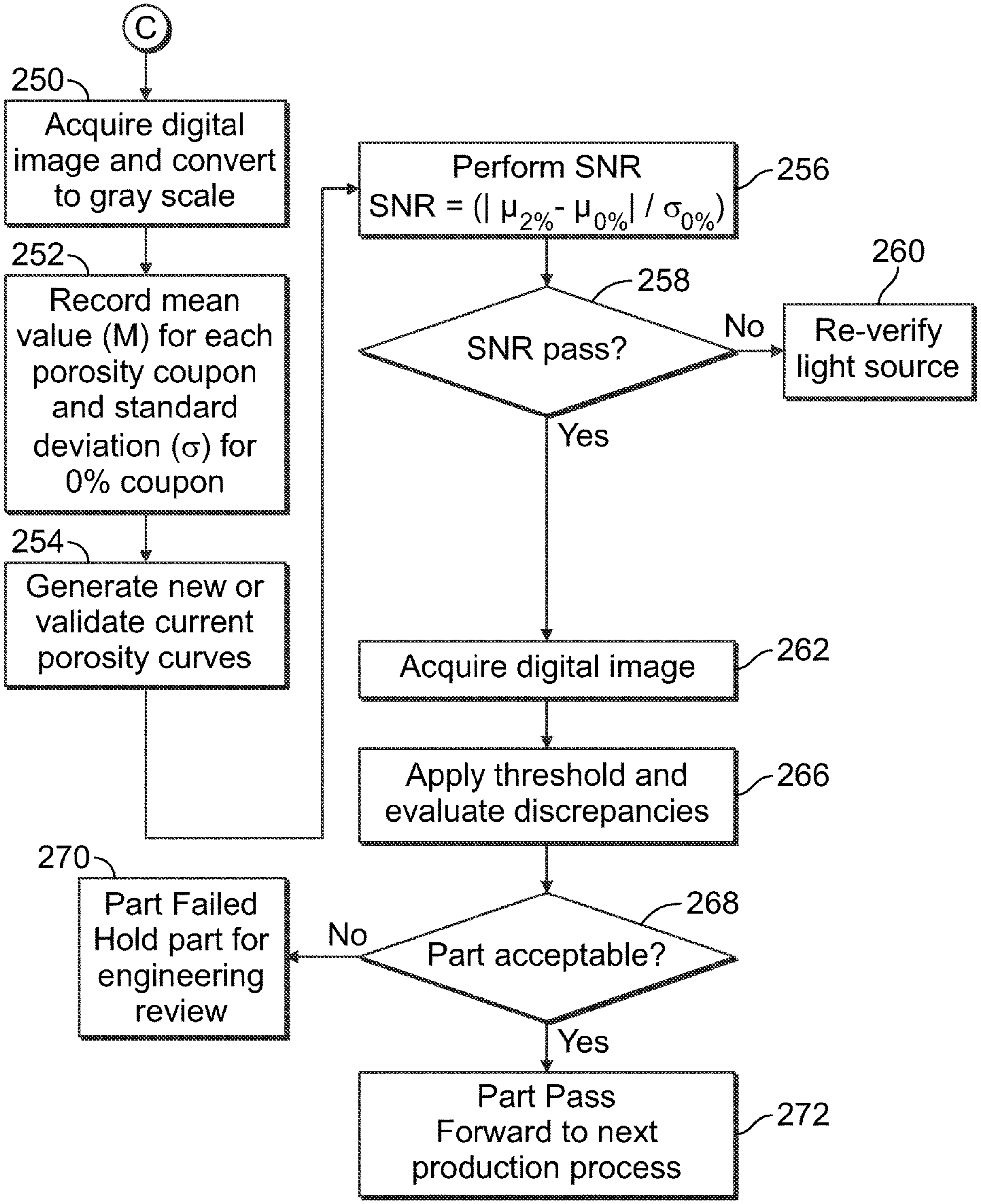
FIG. 7 illustrates a flow chart of a method of detecting a porosity of a part, according to an example of the present disclosure.

FIG. 7 illustrates a flow chart of a method of detecting a porosity of a part, according to an example of the present disclosure. Referring to FIGS. 1, 5, and 7, after confirming that the mean and the standard deviation of the histogram 130 is acceptable, at 250, the control unit 110 converts the digital image(s) 118 of the part 106, as illuminated by the light emitter 102, to a gray scale. At 252, the control unit 110 records a mean value for each porosity coupon. At 252, the control unit 110 also records a standard deviation for a 0% porosity coupon. Then, at 254, the control unit 110 generates new (or validates current) porosity curves.

Porosity coupons contain fine porosity pores at known values from 0% to a maximum which results in decreasing light transmission. These reduced transmission values are used to create and calibrate light transmission or absorption (attenuation) curves.

In at least one a porosity coupon is a test portion of the part 106. In at least one example, the porosity coupon can be a region of the part 106 within the region of interest 119 of the digital image 118 (shown in FIG. 4). The region of interest 119 can be the porosity coupon. The mean decreases, and the standard deviation increases, as porosity increases.

Next, at 256, the control unit 110 determines a signal to noise ratio (SNR) with respect to the region of interest 119 and/or the porosity coupon. At 258, the control unit 110 then determines if the SNR is acceptable, based on predetermined stored data. For example, a 3:1 SNR is acceptable. If, at 258, the SNR is not acceptable, the method proceeds to 260, at which the light emitter 102 is re-verified (and the method can then return to step 200 in FIG. 2).

If, however, the SNR is acceptable at 258, the method proceeds to 262, at which the part 106 is inspected, and digital images 118 are acquired. At 266, the control unit 110 applies the threshold (as previously recorded) to the digital images 118 to evaluate discrepancies. Based on step 266, the control unit 110 determines if the part 106 is acceptable (that is, free of defects) at 268. If not, at 270, the control unit 110 determines that the part 106 has failed (that is, includes undesirable porosity), and is held for engineering review. The control unit 110 may output data regarding such determination to the display 114. For example, the control unit 110 may show one or more messages indicating such determination on the display 114. If, however, the control unit 110 determines that the part is acceptable at 236, at 272, the control unit 110 can pass the part 106 forward to a next production process. The control unit 110 may output data regarding such determination to the display 114.

Referring to FIGS. 1-7, examples of the present disclosure provide quantitative methods to conduct non-destructive inspection (NDI) of parts 106 (such as translucent composite parts) using statistical analysis. The systems and methods described herein remove subjective variability inherent in manual visual inspection of parts.

The systems and methods described herein include the control unit 110, which is configured to automatically inspect the part 106, such as through statistical analysis of one or more digital images 118 of the part 106. The control unit 110 analyzes the digital images 118 to detect surface and/or internal defects of the part 106. The control unit 110 analyzes the digital image(s) 118 to determine a mean and a standard deviation of the digital image(s) 118. In at least one example, the control unit 110 determines the SNR, and compares the SNR against a background to verify that the SNR is acceptable. In at least one example, the control unit 110 also plots the mean and the standard deviation to create a porosity curve.

Figure 8:
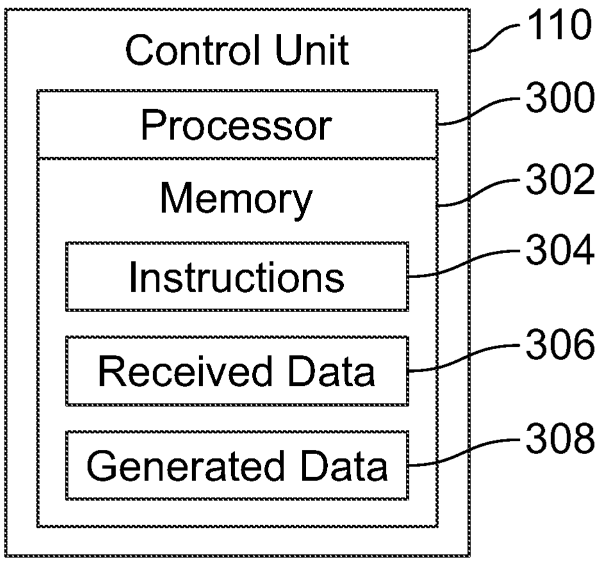
FIG. 8 illustrates a schematic block diagram of a control unit, according to an example of the present disclosure.

FIG. 8 illustrates a schematic block diagram of the control unit 110, according to an example of the present disclosure. In at least one example, the control unit 110 includes at least one processor 300 in communication with a memory 302. The memory 302 stores instructions 304, received data 306, and generated data 308. The control unit 110 shown in FIG. 8 is merely exemplary, and non-limiting.

As used herein, the term "control unit," "central processing unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the control unit 110 may be or include one or more processors that are configured to control operation, as described herein.

The control unit 110 is configured to execute a set of instructions that are stored in one or more data storage units or elements (such as one or more memories), in order to process data. For example, the control unit 110 may include or be coupled to one or more memories. The data storage units may also store data or other information as desired or needed. The data storage units may be in the form of an information source or a physical memory element within a processing machine.

The set of instructions may include various commands that instruct the control unit 110 as a processing machine to perform specific operations such as the methods and processes of the various examples of the subject matter described herein. The set of instructions may be in the form of a software program. The software may be in various forms such as system software or application software. Further, the software may be in the form of a collection of separate programs, a program subset within a larger program, or a portion of a program. The software may also include modular programming in the form of object-oriented programming. The processing of input data by the processing machine may be in response to user commands, or in response to results of previous processing, or in response to a request made by another processing machine.

The diagrams of examples herein may illustrate one or more control or processing units, such as the control unit 110. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the control unit 110 may represent processing circuitry such as one or more of a field programmable gate array (FPGA), application specific integrated circuit (ASIC), microprocessor(s), and/or the like. The circuits in various examples may be configured to execute one or more algorithms to perform functions described herein. The one or more algorithms may include aspects of examples disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

In at least one example, components of the system 100, such as the control unit 110, provide and/or enable a computer system to operate as a special computer system for determining a structural integrity of the part 106, such as through analysis of the digital image(s) 118 of the part 106, as illuminated by the light 104 emitted by the light emitter 102. The control unit 110 improves upon standard computing devices by determining such information and automatically communicating with individuals in an efficient and effective manner.

In at least one example, all or part of the systems and methods described herein are or otherwise include an artificial intelligence (AI) or machine-learning system that can automatically perform the operations of the methods also described herein. In at least one example, the control unit 110 can be or otherwise include a deterministic or rules based evaluation system. In at least one example, the control unit 110 can be an artificial intelligence or machine learning system. These types of systems may be trained from outside information and/or self-trained to repeatedly improve the accuracy with how data is analyzed to determine and present the relevant information to users. For example, an AI control unit 110 can be trained to automatically detect regions of interest within images, statistical features of the images, and the like. Over time, these systems can improve by determining and communicating with increasing accuracy and speed, thereby significantly reducing the likelihood of any potential errors. For example, the AI or machine-learning systems can learn and determine models, associate such models with received data, and determine potential conflicts. The AI or machine-learning systems described herein may include technologies enabled by adaptive predictive power and that exhibit at least some degree of autonomous learning to automate and/or enhance pattern detection (for example, recognizing irregularities or regularities in data), customization (for example, generating or modifying rules to optimize record matching), and/or the like. The systems may be trained and re-trained using feedback from one or more prior analyses of the data, ensemble data, and/or other such data. Based on this feedback, the systems may be trained by adjusting one or more parameters, weights, rules, criteria, or the like, used in the analysis of the same. This process can be performed using the data and ensemble data instead of training data, and may be repeated many times to repeatedly improve the determinations and communications described herein. The training minimizes conflicts and interference by performing an iterative training algorithm, in which the systems are retrained with an updated set of data, and based on the feedback examined prior to the most recent training of the systems. This provides a robust analysis model that can better determine and present statistical information regarding the digital image(s) 118.

Further, the disclosure comprises examples according to the following clauses:

Clause 1. A system comprising:

a light emitter configured to emit light onto or into a part to illuminate the part;

a detector configured to acquire one or more digital images of the part as illuminated by the light; and a control unit in communication with the detector, wherein the control unit is configured to:

receive the one or more digital images of the part as illuminated by the light from the detector, and automatically analyze the one or more digital images of the part as illuminated by the light to one or both of detect one or more defects of the part, or determine a porosity of the part.

Clause 2. The system of Clause 1, wherein the control unit is configured to detect one or more defects of the part and determine the porosity of the part.

Clause 3. The system of Clauses 1 or 2, wherein the detector comprises a digital camera.

Clause 4. The system of any of Clauses 1-3, wherein the light emitter is separated from the part.

Clause 5. The system of any of Clauses 1-4, further comprising a user interface in communication with the control unit, wherein the user interface comprises a display, and wherein the control unit is configured to show information regarding the part on the display.

Clause 6. The system of any of Clauses 1-5, wherein the control unit is configured to automatically analyze the one or more digital images by determining a mean and a standard deviation of one or more portions of the one or more digital images.

Clause 7. The system of any of Clauses 1-6, wherein the control unit is configured to automatically analyze the one or more digital images by determining a signal-to-noise ratio (SNR) of one or more portions of the one of more digital images.

Clause 8. The system of any of Clauses 1-7, wherein the control unit is configured to analyze the one or more digital images to generate a histogram in relation to one or more portions of the one or more digital images, and determine a mean and a standard deviation from the histogram.

Clause 9. The system of any of Clauses 1-8, wherein the control unit is an artificial intelligence or machine learning system.

Clause 10. A method for a system comprising:

a light emitter configured to emit light onto or into a part to illuminate the part;

a detector configured to acquire one or more digital images of the part as illuminated by the light; and a control unit in communication with the detector, wherein the control unit is configured to:

receive the one or more digital images of the part as illuminated by the light from the detector, and automatically analyze the one or more digital images of the part as illuminated by the light to one or both of detect one or more defects of the part, or determine a porosity of the part, the method comprising:

emitting, by the light emitter, the light onto or into the part to illuminate the part;

acquiring, by the detector, the one or more digital images of the part as illuminated by the light;

receiving, by the control unit, the one or more digital images of the part as illuminated by the light from the detector; and automatically analyzing, by the control unit, the one or more digital images of the part as illuminated by the light, wherein said automatically analyzing comprises one or both of detecting the one or more defects of the part, or determining the porosity of the part.

Clause 11. The method of Clause 10, wherein said automatically analyzing comprises the detecting and the determining.

Clause 12. The method of Clauses 10 or 11, wherein the detector comprises a digital camera.

Clause 13. The method of any of Clauses 10-12, wherein the light emitter is separated from the part.

Clause 14. The method of any of Clauses 10-13, further comprising showing, by the control unit, information regarding the part on a display of a user interface in communication with the control unit.

Clause 15. The method of any of Clauses 10-14, further comprising determining a mean and a standard deviation of one or more portions of the one or more digital images.

Clause 16. The method of any of Clauses 10-15, wherein said automatically analyzing comprises determining a signal-to-noise ratio (SNR) of one or more portions of the one of more digital images.

Clause 17. The method of any of Clauses 10-16, wherein said automatically analyzing comprises:

generating a histogram in relation to one or more portions of the one or more digital images; and determining a mean and a standard deviation from the histogram.

Clause 18. The method of any of Clauses 10-17, wherein the control unit is an artificial intelligence or machine learning system.

Clause 19. A system comprising:

a light emitter configured to emit light onto or into a part to illuminate the part, wherein the light emitter is separated from the part;

a detector configured to acquire one or more digital images of the part as illuminated by the light, wherein the detector comprises a digital camera;

a control unit in communication with the detector, wherein the control unit is configured to:

receive the one or more digital images of the part as illuminated by the light from the detector, and automatically analyze the one or more digital images of the part as illuminated by the light to detect one or more defects of the part, and determine a porosity of the part, wherein the control unit is configured to automatically analyze the one or more digital images by determining a mean and a standard deviation of one or more portions of the one or more digital images, and a signal-to-noise ratio (SNR) of one or more portions of the one of more digital images; and a user interface in communication with the control unit, wherein the user interface comprises a display, and wherein the control unit is configured to show information regarding the part on the display.

Clause 20. The system of Clause 19, wherein the control unit is configured to analyze the one or more digital images to generate a histogram in relation to one or more portions of the one or more digital images, and determine the mean and the standard deviation from the histogram.

Clause 21. The system or method of any of the Clauses, wherein the control unit is further configured to subtract the one or more digital images from a baseline image to remove known geometry effects to light transmission, and enhance defect detection.

As described herein, examples of the present disclosure provide improved systems and methods for inspecting component parts to ensure structural integrity. Further, examples of the present disclosure provide efficient and effective systems and methods for inspecting component parts.

While various spatial and directional terms, such as top, bottom, lower, mid, lateral, horizontal, vertical, front and the like can be used to describe examples of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described examples (and/or aspects thereof) can be used in combination with each other. In addition, many modifications can be made to adapt a particular situation or material to the teachings of the various examples of the disclosure without departing from their scope. While the dimensions and types of materials described herein are intended to define the aspects of the various examples of the disclosure, the examples are by no means limiting and are exemplary examples. Many other examples will be apparent to those of skill in the art upon reviewing the above description. The scope of the various examples of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various examples of the disclosure, including the best mode, and also to enable any person skilled in the art to practice the various examples of the disclosure, including making and using any devices or systems and performing any incorporated methods. The patentable scope of the various examples of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A system comprising:

a light emitter including one or more light emitting diodes (LEDs) configured to emit light onto or into a part to illuminate the part;

a detector including a digital camera configured to acquire one or more digital images of the part as illuminated by the light; and a control unit including one more processors, wherein the control unit is in communication with the detector, wherein the control unit is configured to:

receive the one or more digital images of the part as illuminated by the light from the detector, automatically select a region of interest within the one or more digital images, wherein the region of interest is automatically selected as a limited sample area to provide a reference area that is devoid of extraneous features, generate a histogram with respect to the region of interest, wherein the histogram includes a mean and a standard deviation, wherein the light emitter is changed in response to one or both of the mean or the standard deviation being unacceptable, and in response to the mean and the standard deviation being acceptable, automatically analyze the one or more digital images of the part as illuminated by the light to perform one or both of detecting one or more defects of the part, or determining a porosity of the part.

2. The system of claim 1, wherein the control unit is further configured to subtract the one or more digital images from a baseline image to remove known geometry effects to light transmission and enhance defect detection.

3. The system of claim 1, wherein the control unit is configured to detect one or more defects of the part and determine the porosity of the part.

4. The system of claim 1, wherein the light emitter is separated from the part.

5. The system of claim 1, further comprising a user interface in communication with the control unit, wherein the user interface comprises a display, and wherein the control unit is configured to show information regarding the part on the display.

6. The system of claim 1, wherein the control unit is configured to automatically analyze the one or more digital images by determining a signal-to-noise ratio (SNR) of one or more portions of the one or more digital images.

7. The system of claim 1, wherein the control unit further includes an artificial intelligence or machine learning system.

8. The system of claim 1, wherein the control unit is further configured to:
determine if the light emitted by the light emitter is uniform throughout the part by analyzing one or more test images of the part, wherein one or both of the light emitter or the detector are repositioned in relation to one another in response to determining that the light emitted by the light emitter not being uniform throughout the part,
in response to determining that the light emitted by the light emitter is uniform throughout the part, determine if quality indicators within the one or more test images are visible, wherein the light emitter is changed to a different light emitter in response to determining that the quality indicators are not visible within the one or more test images,
in response to determining that quality indicators are visible within the one or more test images, quantitatively assessing the one or more digital images.

9. The system of claim 1, wherein the automatic analysis, by the control unit, of the one or more digital images comprises:
converting the one or more digital images of the part as illuminated by the light emitter to a gray scale,
recording the mean and the standard deviation of the region of interest within the one or more digital images,
adjusting a threshold until the region of interest reaches a predetermined red out,
recording the threshold for a value of the mean,
determining a signal to noise ratio (SNR) with respect to the region of interest,
determining if the SNR is acceptable,
in response to determining that the SNR is unacceptable, re-verifying the light emitter,
in response to determining that the SNR is acceptable, inspecting the one or more digital images,
applying the threshold to the one or more digital images to evaluate discrepancies, and
determining, based on the threshold applied to the one or more digital images, if the part is acceptable.

10. The system of claim 1, wherein the region of interest includes a porosity coupon that is a sub-region of interest of the part within the region of interest.

11. A method for a system comprising:
a light emitter including one or more light emitting diodes (LEDs) configured to emit light onto or into a part to illuminate the part;
a detector including a digital camera configured to acquire one or more digital images of the part as illuminated by the light; and
a control unit including one more processors, wherein the control unit is in communication with the detector, wherein the control unit is configured to:
receive the one or more digital images of the part as illuminated by the light from the detector,
automatically select a region of interest within the one or more digital images, wherein the region of interest is automatically selected as a limited sample area to provide a reference area that is devoid of extraneous features,
generate a histogram with respect to the region of interest, wherein the histogram includes a mean and a standard deviation, wherein the light emitter is changed in response to one or both of the mean or the standard deviation being unacceptable, and
in response to the mean and the standard deviation being acceptable, automatically analyze the one or more digital images of the part as illuminated by the light to perform one or both of detecting one or more defects of the part, or determining a porosity of the part,
the method comprising:
emitting, by the light emitter, the light onto or into the part to illuminate the part;
acquiring, by the detector, the one or more digital images of the part as illuminated by the light;
receiving, by the control unit, the one or more digital images of the part as illuminated by the light from the detector;
automatically selecting, by the control unit, the region of interest within the one or more digital images;
generating, by the control unit, the histogram with respect to the region of interest; and
in response to the mean and the standard deviation being acceptable, automatically analyzing, by the control unit, the one or more digital images of the part as illuminated by the light, wherein said automatically analyzing comprises one or both of detecting the one or more defects of the part, or determining the porosity of the part.

12. The method of claim 11, wherein said automatically analyzing comprises the detecting and the determining.

13. The method of claim 11, wherein the light emitter is separated from the part.

14. The method of claim 11, further comprising showing, by the control unit, information regarding the part on a display of a user interface in communication with the control unit.

15. The method of claim 11, wherein said automatically analyzing comprises determining a signal-to-noise ratio (SNR) of one or more portions of the one or more digital images.

16. The method of claim 11, wherein the control unit further includes an artificial intelligence or machine learning system.

17. The method of claim 11, further comprising:
determining, by the control unit, if the light emitted by the light emitter is uniform throughout the part by analyzing one or more test images of the part, wherein one or both of the light emitter or the detector are repositioned in relation to one another in response to determining that the light emitted by the light emitter not being uniform throughout the part,
in response to determining that the light emitted by the light emitter is uniform throughout the part, determining, by the control unit, if quality indicators within the one or more test images are visible, wherein the light emitter is changed to a different light emitter in response to determining that the quality indicators are not visible within the one or more test images,
in response to determining that quality indicators are visible within the one or more test images, quantitatively assessing, by the control unit, the one or more digital images.

18. The method of claim 11, wherein said automatically analyzing comprises:
converting, by the control unit, the one or more digital images of the part as illuminated by the light emitter to a gray scale, recording, by the control unit, the mean and the standard deviation of the region of interest within the one or more digital images, adjusting, by the control unit, a threshold until the region of interest reaches a predetermined red out, recording, by the control unit, the threshold for a value of the mean, determining, by the control unit, a signal to noise ratio (SNR) with respect to the region of interest, determining, by the control unit, if the SNR is acceptable, in response to determining that the SNR is unacceptable, re-verifying, by the control unit, the light emitter, in response to determining that the SNR is acceptable, inspecting, by the control unit, the one or more digital images, applying, by the control unit, the threshold to the one or more digital images to evaluate discrepancies, and determining, by the control unit based on said applying, if the part is acceptable.

19. The method of claim 11, wherein the region of interest includes a porosity coupon that is a sub-region of interest of the part within the region of interest.

20. A system comprising:

a light emitter including one or more light emitting diodes (LEDs) configured to emit light onto or into a part to illuminate the part, wherein the light emitter is separated from the part;

a detector including a digital camera configured to acquire one or more digital images of the part as illuminated by the light, wherein the detector comprises a digital camera;

a control unit including one more processors, wherein the control unit is in communication with the detector, wherein the control unit is configured to:

receive the one or more digital images of the part as illuminated by the light from the detector, automatically select a region of interest within the one or more digital images, wherein the region of interest is automatically selected as a limited sample area to provide a reference area that is devoid of extraneous features, generate a histogram with respect to the region of interest, wherein the histogram includes a mean and a standard deviation, wherein the light emitter is changed in response to one or both of the mean or the standard deviation being unacceptable, and in response to the mean and the standard deviation being acceptable, automatically analyze the one or more digital images of the part as illuminated by the light to detect one or more defects of the part, and determine a porosity of the part, wherein the control unit is configured to automatically analyze the one or more digital images by determining a signal-to-noise ratio (SNR) of one or more portions of the one or more digital images; and a user interface in communication with the control unit, wherein the user interface comprises a display, and wherein the control unit is configured to show information regarding the part on the display.

21. The system of claim 20, wherein the automatic analysis, by the control unit, of the one or more digital images comprises:

converting the one or more digital images of the part as illuminated by the light emitter to a gray scale, recording the mean and the standard deviation of the region of interest within the one or more digital images, adjusting a threshold until the region of interest reaches a predetermined red out, recording the threshold for a value of the mean, determining the SNR with respect to the region of interest, determining if the SNR is acceptable, in response to determining that the SNR is unacceptable, re-verifying the light emitter, in response to determining that the SNR is acceptable, inspecting the one or more digital images, applying the threshold to the one or more digital images to evaluate discrepancies, and determining, based on the threshold applied to the one or more digital images, if the part is acceptable.

* * * * *